United States Patent
Iguchi et al.

(10) Patent No.: US 10,530,013 B2
(45) Date of Patent: Jan. 7, 2020

(54) METHOD OF MANUFACTURING NON-AQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Hiroki Iguchi, Nagoya (JP); Hideaki Fujita, Kyotanabe (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 154 days.

(21) Appl. No.: 15/724,668

(22) Filed: Oct. 4, 2017

(65) Prior Publication Data

US 2018/0108938 A1 Apr. 19, 2018

(30) Foreign Application Priority Data

Oct. 19, 2016 (JP) ................................ 2016-205075

(51) Int. Cl.
*H01M 10/058* (2010.01)
*H01M 10/0569* (2010.01)

(52) U.S. Cl.
CPC ..... *H01M 10/058* (2013.01); *H01M 10/0569* (2013.01)

(58) Field of Classification Search
CPC . H01M 10/05; H01M 10/058; H01M 10/0569
See application file for complete search history.

(56) References Cited

U.S. PATENT DOCUMENTS

| 2010/0081064 A1* | 4/2010 | Watanabe | H01M 4/5825 |
| | | | 429/338 |
| 2013/0309562 A1* | 11/2013 | Lee | H01M 10/0564 |
| | | | 429/188 |
| 2015/0372343 A1* | 12/2015 | Mitsuhashi | H01M 10/0525 |
| | | | 429/163 |

FOREIGN PATENT DOCUMENTS

JP 2010-086722 A 4/2010

* cited by examiner

*Primary Examiner* — Karie O'Neill Apicella
(74) *Attorney, Agent, or Firm* — Sughrue Mion, PLLC

(57) ABSTRACT

A method of manufacturing a non-aqueous electrolyte secondary battery includes: (A) constructing an electrode group including a positive electrode and a negative electrode; (B) impregnating the electrode group with a first electrolyte solution; (C) charging the electrode group impregnated with the first electrolyte solution to a voltage of 4.3 V or more; and (E) manufacturing the non-aqueous electrolyte secondary battery by impregnating the electrode group with a second electrolyte solution after the charging. The first electrolyte solution includes a first solvent, a first lithium salt, and biphenyl. The first solvent does not include 1,2-dimethoxyethane. The second electrolyte solution includes a second solvent and a second lithium salt. The second solvent includes 1,2-dimethoxyethane.

10 Claims, 2 Drawing Sheets

METHOD OF MANUFACTURING NON-AQUEOUS ELECTROLYTE SECONDARY BATTERY

This nonprovisional application is based on Japanese Patent Application No. 2016-205075 filed on Oct. 19, 2016 with the Japan Patent Office, the entire contents of which are hereby incorporated by reference.

BACKGROUND

Field

The present disclosure relates to a method of manufacturing a non-aqueous electrolyte secondary battery.

Description of the Background Art

Japanese Patent Laying-Open No. 2010-086722 discloses a non-aqueous electrolyte secondary battery (hereinafter may be simply referred to as a "battery") comprising a positive electrode including a lithium phosphoric acid compound having an olivine structure, and an electrolyte solution including 1,2-dimethoxyethane (DME).

SUMMARY

DME is known as a solvent of an electrolyte solution. DME has a high donor number. Accordingly, DME is advantageous for dissociation of a supporting electrolyte salt (lithium salt). DME has a low viscosity and also has a low melting point. Therefore, by using DME, for example, improvement in low-temperature properties of batteries is expected DME is in widespread use as a solvent for primary batteries. However, DME is not in widespread use as a solvent for secondary batteries, because DME has a low oxidation potential. For example, when DME is used for a secondary battery in which a voltage at full charge reaches 4.0 V or more, DME is oxidatively decomposed during each charging. Thereby, cycle durability of the battery is reduced.

In Japanese Patent Laying-Open No. 2010-086722, a lithium phosphoric acid compound having an olivine structure is used for the positive electrode. The secondary battery comprising the positive electrode operates at a voltage of about 3 to 3.5 V. It is considered that oxidative decomposition of DME is suppressed due to a low operating voltage.

However, in Japanese Patent Laying-Open No 2010-086722, the battery is merely constructed within a voltage range in which DME is less likely to be oxidatively decomposed. That is, in Japanese Patent Laying-Open No. 2010-086722, oxidative decomposition of DME is not suppressed essentially. In secondary batteries, an overvoltage is also applied during charging. Even when a secondary battery has an operating voltage of about 3.5 V, there is a possibility that a positive electrode potential locally or temporarily may exceed an oxidation potential of DME during charging. Further, from the viewpoint of energy density, secondary batteries having a higher operating voltage (for example, 3.5 to 4.5 V) are also needed.

Accordingly, an object of the present disclosure is to provide a non-aqueous electrolyte secondary battery in which oxidative decomposition of DME is suppressed.

Hereinafter, the technical construction and the function and effect of the present disclosure will be described. However, the mechanism of the function of the present disclosure includes presumption, and the scope of claims should not be limited depending on whether the mechanism of the function is correct or incorrect.

[1] A method of manufacturing a non-aqueous electrolyte secondary battery of the present disclosure includes the following (A) to (C) and (E):

(A) constructing an electrode group including a positive electrode and a negative electrode, (B) impregnating the electrode group with a first electrolyte solution;

(C) charging the electrode group impregnated with the first electrolyte solution to a voltage of 4.3 V or more; and (E) manufacturing the non-aqueous electrolyte secondary battery by impregnating the electrode group with a second electrolyte solution after the charging.

The first electrolyte solution includes a first solvent, a first lithium salt, and biphenyl. The first solvent does not include 1,2-dimethoxyethane. The second electrolyte solution includes a second solvent and a second lithium salt. The second solvent includes 1,2-dimethoxyethane.

According to the new findings of the present disclosure, a specific oxide coating film has a function of suppressing oxidative decomposition of 1,2-dimethoxyethane (DME). That is, an oxide coating film formed at the positive electrode by oxidatively decomposing biphenyl (BP) at a voltage of 4.3 V or more can suppress oxidative decomposition of DME.

Here, an electrolyte solution including both DME and BP seems to be effective. However, when an electrolyte solution includes both DME and BP, DME is oxidatively decomposed before an oxide coating film derived from BP is formed.

Accordingly, in the manufacturing method of the present disclosure, two types of electrolyte solutions are used in order. That is, the first electrolyte solution and the second electrolyte solution are used in order. The first electrolyte solution includes BP but does not include DME. The second electrolyte solution includes DME.

First, the electrode group is impregnated with the first electrolyte solution. By charging the electrode group impregnated with the first electrolyte solution to a voltage of 4.3 V or more, an oxide coating film derived from BP is formed at the positive electrode.

After the oxide coating film derived from BP is formed, the electrode group is impregnated with the second electrolyte solution including DME. Thereby, a non-aqueous electrolyte secondary battery in which oxidative decomposition of DME is suppressed is manufactured.

In the non-aqueous electrolyte secondary battery manufactured by the manufacturing method of the present disclosure, since the second electrolyte solution includes DME, improvement in low-temperature property is expected. Since the oxide coating film derived from BP suppresses oxidative decomposition of DME, reduction in cycle durability can be suppressed.

[2] The negative electrode preferably includes composite particles. The composite particles each include graphite and amorphous carbon. The amorphous carbon covers a surface of the graphite. The first solvent preferably includes ethylene carbonate.

Graphite functions as a negative electrode active material. Graphite has a low operating potential. By using graphite as a negative electrode active material, a battery having a high operating voltage can be manufactured.

In an electrolyte solution, a lithium salt is dissociated into lithium ions and counter anions. In the electrolyte solution, the lithium ions are solvated in a solvent. During charging, the solvated lithium ions are desolvated at an interface between the electrolyte solution and graphite. Thereby, the lithium ions are individually intercalated into the graphite. However, since DME used in the present disclosure has a high donor number, desolvation is less likely to proceed. Accordingly, there is a possibility that DME may be intercalated into the graphite together with the lithium ions. This phenomenon is also referred to as co-intercalation. When co-intercalation occurs, DME is reductively decomposed within the graphite. Gas is generated within the graphite due to the reductive decomposition of DME. Thereby, the crystal structure of the graphite is damaged. The damage to the crystal structure of the graphite results in a reduction in battery capacity.

Accordingly, in the manufacturing method described above in [2], composite particles are used. In the composite particles, the surface of the graphite is covered with the amorphous carbon. The amorphous carbon interposed between the electrolyte solution and the graphite is considered to promote desolvation of the lithium ions.

Further, in the manufacturing method described above in [2], the first solvent includes ethylene carbonate (EC). When the electrode group is charged to a voltage of 4.3 V or more, EC is reductively decomposed on surfaces of the composite particles. By the reductive decomposition of EC, a coating film is formed on the surfaces of the composite particles. This coating film can serve as a good SEI (solid electrolyte interface). A good SEI is considered to promote desolvation of the lithium ions. Furthermore, desolvation of the lithium ions is further promoted by a synergistic interaction between the amorphous carbon and the SEI. Thereby, co-intercalation of DME can be significantly suppressed.

[3] The second solvent preferably includes more than or equal to 10 volume % and less than or equal to 40 volume % of 1,2-dimethoxyethane.

Since the second solvent includes more than or equal to 10 volume % of DME, improvement in low-temperature properties is expected. The second solvent may include less than or equal to 40 volume % of DME. The rest of the second solvent other than DME can include a solvent having a high relative permittivity (high-permittivity solvent), a solvent having a low viscosity (low-viscosity solvent), and the like, for example.

[4] The second solvent preferably further includes more than or equal to 10 volume % and less than or equal to 30 volume % of ethylene carbonate, and more than or equal to 10 volume % and less than or equal to 30 volume % of ethyl methyl carbonate.

Ethylene carbonate (EC) is a high-permittivity solvent. Since the second solvent includes more than or equal to 10 volume % and less than or equal to 30 volume % of EC, dissociation of the second lithium salt can be promoted. Thereby, improvement in low-temperature properties is expected. Further, since the second solvent includes more than or equal to 10 volume % and less than or equal to 30 volume % of EC, a good SEI can be formed at the negative electrode. Thereby, improvement in cycle durability is also expected.

It should be noted that the SEI may be consumed by a charging/discharging cycle or the like. Therefore, even though the SEI is already formed from the first solvent including EC, it is considered preferable that the second solvent includes EC.

Ethyl methyl carbonate (EMC) is a low-viscosity solvent. EMC also has a low melting point. Since the second solvent includes EMC, the second electrolyte has a low viscosity. Thereby, improvement in low-temperature properties is expected.

[5] In [4] described above, the second solvent preferably further includes more than or equal to 10 volume % and less than or equal to 30 volume % of dimethyl carbonate. In the second solvent, dimethyl carbonate has a volume ratio less than that of a sum of 1,2-dimethoxyethane and ethyl methyl carbonate.

Since the second solvent further includes dimethyl carbonate (DMC), improvement in cycle durability is expected. However, DMC has a melting point of about 3° C. DME has a melting point of about −58° C., and EMC has a melting point of about −55° C. Therefore, when DMC has a volume ratio more than or equal to that of the sum of DME and EMC, there is a possibility that resistance at an extremely low temperature (for example, about −40° C.) may increase.

[6] The first electrolyte solution preferably includes more than or equal to 1 mass % and less than or equal to 4 mass % of biphenyl.

When BP is less than 1 mass %, there is a possibility that the effect of suppressing oxidative decomposition of DME may be reduced. BP may exceed 4 mass %. However, when BP exceeds 4 mass %, there is a possibility that the oxide coating film derived from BP may become too thick, and thereby the effect of improving low-temperature properties may be reduced.

[7] The positive electrode preferably includes a compound expressed by a formula (I):

$$LiNi_aCo_bMn_cO_2 \qquad (I)$$

where $0<a<1$, $0<b<1$, $0<c<1$, and $a+b+c=1$.

In the manufacturing method of the present disclosure, the electrode group is charged to a voltage of 4.3 V or more. Accordingly, in the positive electrode active material, a change in crystal structure is desirably small in a voltage range of 4.3 V or more. In the compound expressed by the above formula (I), a change in crystal structure tends to be small in the voltage range of 4.3 V or more.

Further, in the manufacturing method of the present disclosure, a non-aqueous electrolyte secondary battery in which oxidative decomposition of DME is suppressed is manufactured. Accordingly, the non-aqueous electrolyte secondary battery can be manufactured as a battery having a high operating voltage. Having a high operating voltage contributes to improvement in energy density. By using the compound expressed by the above formula (I) as the positive electrode active material, a non-aqueous electrolyte secondary battery which operates stably in the range of 3 to 4.1 V, for example, can be manufactured.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment of the present disclosure (hereinafter referred to as the "present embodiment") will be described. However, the description below is not intended to limit the scope of the claims.

<Non-Aqueous Electrolyte Secondary Battery>

First, an overview of a non-aqueous electrolyte secondary battery manufactured by a method of manufacturing the non-aqueous electrolyte secondary battery in the present embodiment will be described.

Figure 1:
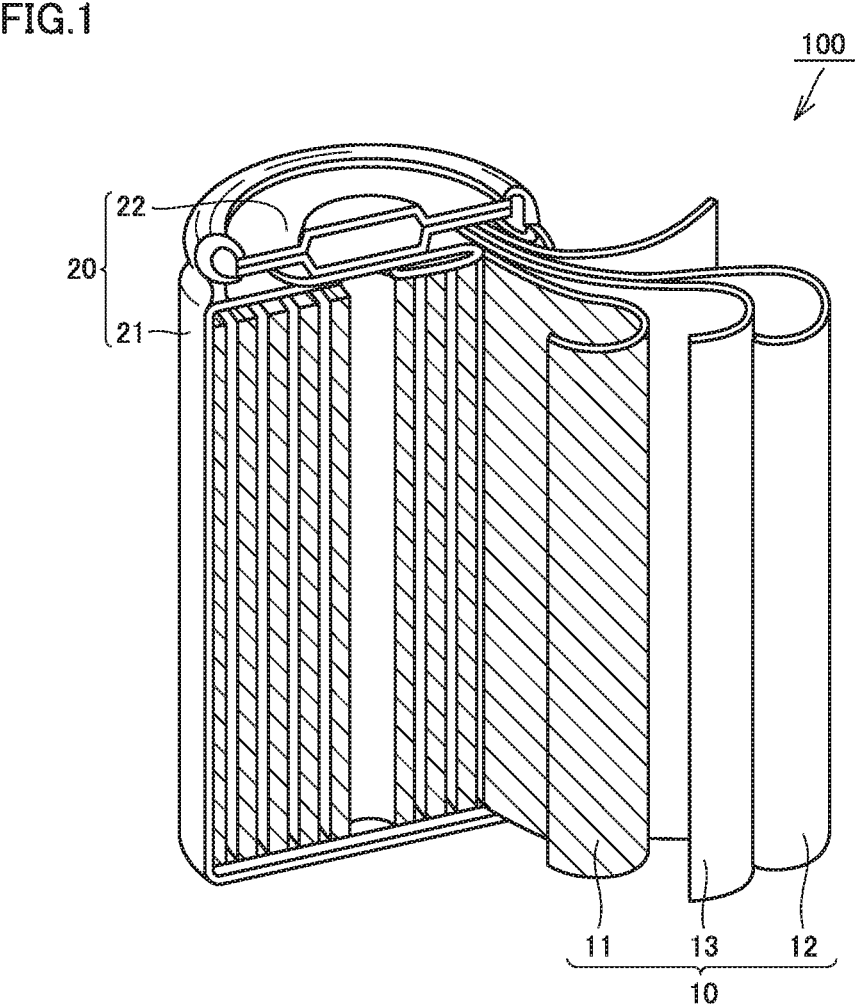
FIG. 1 is a schematic view showing one example of a construction of a non-aqueous electrolyte secondary battery in accordance with an embodiment of the present disclosure.

FIG. 1 is a schematic view showing one example of a construction of the non-aqueous electrolyte secondary battery in accordance with the present embodiment. A battery 100 includes a case 20. Case 20 in FIG. 1 has a cylindrical shape. However, the case in the present embodiment may have a prismatic shape (may be a flat rectangular parallelepiped). Within case 20, an electrode group 10 and an electrolyte solution (not shown) are housed. Electrode group 10 in FIG. 1 is a wound-type electrode group. However, the electrode group in the present embodiment may be a stack-type electrode group. Electrode group 10 includes a positive electrode 11 and a negative electrode 12. Electrode group 10 further includes a separator 13. Separator 13 is interposed between positive electrode 11 and negative electrode 12. Electrode group 10 is impregnated with the electrolyte solution.

<Method of Manufacturing Non-Aqueous Electrolyte Secondary Battery>

A method of manufacturing the non-aqueous electrolyte secondary battery will be described below.

Figure 2:
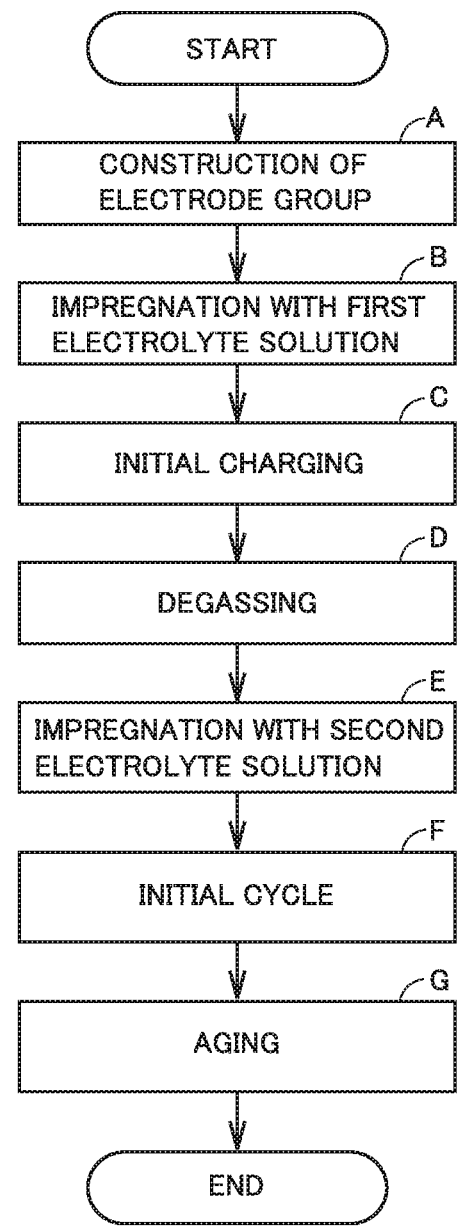
FIG. 2 is a flowchart schematically showing a method of manufacturing the non-aqueous electrolyte secondary battery in accordance with the embodiment of the present disclosure.

FIG. 2 is a flowchart schematically showing the method of manufacturing the non-aqueous electrolyte secondary battery in the present embodiment. The manufacturing method in the present embodiment includes (A) construction of the electrode group, (B) impregnation with a first electrolyte solution, (C) initial charging, and (E) impregnation with a second electrolyte solution.

The manufacturing method in the present embodiment may further include (D) degassing between (C) initial charging and (E) impregnation with the second electrolyte solution. The manufacturing method in the present embodiment may further include (F) an initial cycle and (G) aging after (E) impregnation with the second electrolyte solution.

The manufacturing method in the present embodiment will now be described in order.

<<(A) Construction of Electrode Group>>

The manufacturing method in the present embodiment includes (A) constructing electrode group 10 including positive electrode 11 and negative electrode 12. Here, first, positive electrode 11 and negative electrode 12 are prepared.

(Preparation of Positive Electrode)

Positive electrode 11 can be prepared by a conventionally known method. Positive electrode 11 can be prepared, for example, by the following procedure. A positive electrode composite material paste is prepared. The positive electrode composite material paste is coated on a surface of a current collecting foil and dried to form a positive electrode composite material layer. Thereby, the positive electrode is prepared. For the coating, for example, a die coater or the like is used. The current collecting foil may be an aluminum (Al) foil, an Al alloy foil, or the like, for example. The current collecting foil may have a thickness of about 5 to 30 µm, for example.

Positive electrode 11 is processed to have a predetermined size in accordance with the specifications of electrode group 10. The processing herein includes rolling and cutting. For example, positive electrode 11 may be rolled such that the positive electrode composite material layer has a thickness of about 10 to 150 µm. When electrode group 10 is of the wound type, positive electrode 11 is cut in a strip-like shape. When the electrode group is of the stack type, the positive electrode is cut in a rectangular shape.

The positive electrode composite material paste is prepared by mixing a positive electrode active material, a conductive material, a binder, a solvent, and the like. For the mixing, for example, a planetary mixer or the like is used. A solid content of the positive electrode composite material paste includes, for example, 80 to 98 mass % of the positive electrode active material, 1 to 15 mass % of the conductive material, and 1 to 5 mass % of the binder. The solid content represents the components other than the solvent.

The positive electrode active material is particles which can occlude and emit lithium ions. The positive electrode active material may have an average particle size of about 1 to 20 µm (typically, 5 to 10 µm), for example. The "average particle size" in the present specification represents the size of particles at an integrated value of 50% from the finest particle in volume-based particle size distribution measured by a laser diffraction scattering method. The positive electrode active material should not be limited in particular. Examples of the positive electrode active material may include $LiCoO_2$, $LiNiO_2$, $LiMnO_2$, $LiMn_2O_4$, $LiFePO_4$, and the like. The positive electrode active material may be used alone, or two or more types thereof may be used in combination.

In the present embodiment, in (C) initial charging described later, the electrode group is charged to a voltage of 4.3 V or more. Accordingly, the positive electrode active material is desirably a compound having a stable crystal structure even when it is charged to 4.3 V or more. From this viewpoint, the positive electrode active material is preferably a compound expressed by the above formula (I). That is, the positive electrode preferably includes a compound expressed by the above formula (I). A positive electrode active material including three types of transition metals, Ni, Co, and Mn, like the compound expressed by the above formula (I), is also referred to as a ternary positive electrode active material. The ternary positive electrode active material has a good balance between energy density and thermal stability. The ternary positive electrode active material can have a high operating potential. Since the positive electrode includes the ternary positive electrode active material, a battery having a high operating voltage can be manufactured.

Examples of the compound expressed by the above formula (I) include $LiNi_{1/3}Co_{1/3}Mn_{1/3}O_2$, $LiNi_{0.8}Co_{0.15}Mn_{0.05}O_2$, $LiNi_{0.7}Co_{0.2}Mn_{0.1}O_2$, $LiNi_{0.6}Co_{0.2}Mn_{0.2}O_2$, $LiNi_{0.5}Co_{0.2}Mn_{0.3}O_2$, $LiNi_{0.4}Co_{0.2}Mn_{0.4}O_2$, $LiNi_{0.2}Co_{0.3}Mn_{0.5}O_2$, $LiNi_{0.2}Co_{0.2}Mn_{0.6}O_2$, and the like. In the above formula (I), a, b, and c more preferably satisfy $0.1<a<0.5$, $0.1<b<0.5$, and $0.1<c<0.5$, and further preferably satisfy $0.2<a<0.4$, $0.2<b<0.4$, and $0.2<c<0.4$.

From the viewpoint of energy density, the positive electrode active material is preferably a 4 V-class positive electrode active material. The 4 V-class positive electrode active material in the present specification represents a positive electrode active material which has a flat potential region (plateau region) in the range of 3.5 to 4.5 V (vs. Li/Li$^+$). Examples of the 4 V-class positive electrode active material include $LiCoO_2$, $LiNiO_2$, $LiMnO_2$, $LiMn_2O_4$, and the compound expressed by the above formula (I). Since DME has a low oxidation potential, it has been difficult to apply DME to a non-aqueous electrolyte secondary battery which uses a 4 V-class positive electrode active material. However, in the present embodiment, the 4 V-class positive electrode active material can be used, because an oxide coating film derived from BP suppresses oxidative decomposition of DME.

The conductive material should not be limited in particular. Examples of the conductive material include: carbon black such as acetylene black, thermal black, or furnace black; vapor grown carbon fiber (VGCF); and the like. The conductive material may be used alone, or two or more types thereof may be used in combination.

The binder should not be limited in particular, either. Examples of the binder include polyvinylidene fluoride (PVdF), polytetrafluoroethylene (PTFE), polyacrylic acid (PAA), and the like. The binder may be used alone, or two or more types thereof may be used in combination. The solvent is selected in accordance with the type of the binder. For example, when PVdF is used as the binder, N-methyl-2-pyrrolidone (NMP) can be used as the solvent.

(Preparation of Negative Electrode)

Negative electrode 12 can be prepared by a conventionally known method. Negative electrode 12 is prepared, for example, by the following procedure. A negative electrode composite material paste is prepared. The negative electrode composite material paste is coated on a surface of a current collecting foil and dried to form a negative electrode composite material layer. Thereby, negative electrode 12 is prepared. For the coating, for example, a die coater or the like is used. The current collecting foil may be a copper (Cu) foil, a Cu alloy foil, or the like, for example. The current collecting foil may have a thickness of about 5 to 30 µm, for example.

Negative electrode 12 is processed to have a predetermined size in accordance with the specifications of electrode group 10. The processing herein includes rolling and cutting. For example, negative electrode 12 may be rolled such that the negative electrode composite material layer has a thickness of about 10 to 150 µm. When electrode group 10 is of the wound type, negative electrode 12 is cut in a strip-like shape. When the electrode group is of the stack type, the negative electrode is cut in a rectangular shape.

The negative electrode composite material paste is prepared by mixing a negative electrode active material, a conductive material, a binder, a solvent, and the like. For the mixing, for example, a planetary mixer or the like is used. A solid content of the negative electrode composite material paste includes, for example, 90 to 99 mass % of the negative electrode active material, 0 to 5 mass % of the conductive material, and 1 to 5 mass % of the binder.

The negative electrode active material is particles which can occlude and emit lithium ions. The negative electrode active material may have an average particle size of about 1 to 20 µm (typically, 5 to 10 µm), for example. The negative electrode active material should not be limited in particular. Examples of the negative electrode active material may include graphite, soft carbon, hard carbon, silicon, silicon oxide, tin, tin oxide, $Li_{4/3}Ti_{5/3}O_4$, and the like. The negative electrode active material may be used alone, or two or more types thereof may be used in combination.

From the viewpoint of energy density, the negative electrode active material is preferably graphite. The graphite may be natural graphite or artificial graphite. From the viewpoint of capacity, the graphite is preferably natural graphite. The natural graphite is typically flake particles. The natural graphite may be spheroidized. That is, the graphite may be spheroidized natural graphite. Spheroidization treatment represents treatment which causes the outer shape of the flake particles to be close to a spherical shape by friction and crushing in the air flow, for example. Spheroidization treatment suppresses exposure of an edge surface which is active with respect to a solvent of an electrolyte solution. Thereby, for example, improvement in cycle durability is expected.

The graphite is preferably covered with amorphous carbon to suppress co-intercalation of DME. That is, the negative electrode preferably includes composite particles. The composite particles each include graphite and amorphous carbon. The amorphous carbon covers a surface of the graphite.

It should be noted that co-intercalation of DME can also be suppressed when $Li_{4/3}Ti_{5/3}O_4$ is used as the negative electrode active material. However, $Li_{4/3}Ti_{5/3}O_4$ has an operating potential of about 1.55 V (vs. $Li/Li^+$). Graphite has an operating potential of about 0.1 V (vs. $Li/Li^+$), for example. The operating voltage of a battery is a difference between the operating potential of a positive electrode active material and the operating potential of a negative electrode active material. Therefore, in order to manufacture a battery having a high operating voltage, graphite is more preferable as a negative electrode active material than $Li_{4/3}Ti_{5/3}O_4$.

The conductive material should not be limited in particular. Examples of the conductive material include: carbon black such as acetylene black, thermal black, or furnace black; VGCF; and the like. The conductive material may be used alone, or two or more types thereof may be used in combination. For example, when the negative electrode active material has sufficient conductivity as in a case where the negative electrode active material is graphite, the conductive material may not be used.

The binder should not be limited in particular, either. Examples of the binder include carboxymethyl cellulose (CMC), styrene-butadiene rubber (SBR), PAA, and the like. The binder may be used alone, or two or more types thereof may be used in combination. The solvent is selected in accordance with the type of the binder. For example, when CMC and SBR are used as the binder, water can be used as the solvent.

(Construction of Electrode Group)

Electrode group 10 includes positive electrode 11 and negative electrode 12. Typically, the electrode group further includes separator 13. Separator 13 is interposed between positive electrode 11 and negative electrode 12. Electrode group 10 is constructed as follows. For example, strip-like positive electrode 11 and strip-like negative electrode 12 are stacked to face each other, with strip-like separator 13 interposed therebetween, and then are wound. Thereby, wound-type electrode group 10 is constructed. Alternatively, rectangular positive electrodes and rectangular negative electrodes are alternately stacked to face each other, with each rectangular separator interposed therebetween. Thereby, the stack-type electrode group is constructed.

Separator 13 is an electrically insulating porous film. Separator 13 may have a thickness of about 5 to 30 µm, for example. Separator 13 may include a polyethylene (PE) porous film, a polypropylene (PP) porous film, or the like, for example. Separator 13 may have a multilayer structure. For example, separator 13 may have a three-layer structure. The three-layer structure can be constructed by stacking a PP porous film, a PE porous film, and a PP porous film in this order, for example. Separator 13 may include a heat-resistant layer on its surface. The heat-resistant layer includes a heat-resistant material. Examples of the heat-resistant material include alumina, titania, polyimide, and the like.

<<(B) Impregnation with First Electrolyte Solution>>

The manufacturing method in the present embodiment includes (B) impregnating electrode group 10 with the first electrolyte solution. Typically, the impregnation with the first electrolyte solution is performed in a state where electrode group 10 is housed in case 20.

Case 20 is a container for housing electrode group 10 and the electrolyte solution. For example, an Al alloy, stainless steel (SUS), or the like can constitute case 20. However, a pouch made of an aluminum laminate film or the like, for example, may constitute case 20, as long as it has predetermined sealing properties.

Case 20 includes a main body 21 and a lid 22. Lid 22 is a member for closing an opening in main body 21. Lid 22 may include an external terminal, a solution pouring hole (both not shown), and the like. The solution pouring hole is a hole through which the electrolyte solution is poured into case 20. The solution pouring hole is sealed with a plug, for example. Main body 21 and lid 22 are bonded by laser welding, swaging, or the like, for example. Case 20 may include a safety valve, a current interrupt device (CID), and the like.

Electrode group 10 is housed in case 20. Electrode group 10 is connected with the external terminal. The first electrolyte solution in a predetermined amount is poured into case 20 through the solution pouring hole, for example. The first electrolyte solution may be poured through the opening in main body 21. Electrode group 10 is impregnated with the first electrolyte solution poured into case 20. The impregnation may be performed at about 20 to 40° C. The impregnation may be performed in an atmospheric pressure environment. The impregnation may be performed in a reduced pressure environment, or in an increased pressure environment.

(First Electrolyte Solution)

The first electrolyte solution includes a first solvent, a first lithium salt, and biphenyl (BP). BP is oxidatively decomposed in (C) initial charging described later, and thereby forms an oxide coating film at positive electrode 11. The oxide coating film derived from BP can suppress oxidative decomposition of DME.

The first electrolyte solution preferably includes more than or equal to 1 mass % and less than or equal to 4 mass O/% of BP. When BP is less than 1 mass %, there is a possibility that the effect of suppressing oxidative decomposition of DME may be reduced. BP may exceed 4 mass %. However, when BP exceeds 4 mass %, there is a possibility that the oxide coating film may become too thick, and thereby the effect of improving low-temperature properties may be reduced. The first electrolyte solution more preferably includes more than or equal to 1 mass % and less than or equal to 3 mass % of BP.

The first solvent does not include DME. As long as the first solvent does not include DME, the composition of the first solvent should not be limited in particular.

The first solvent preferably includes EC. EC forms a good SEI on a surface of the negative electrode active material in (C) initial charging. When the negative electrode active material is the composite particles described above, co-intercalation of DME can be significantly suppressed by a synergistic interaction between amorphous carbon and the SEI.

There is also a possibility that the first electrolyte solution may be mixed with the second electrolyte solution described later within case 20. Accordingly, the first solvent desirably includes the same component as that of a second solvent. The first solvent can include EC, DMC, and EMC, for example.

As an example, the first solvent may include (i) more than or equal to 10 volume % and less than or equal to 30 volume % of EC, and (ii) more than or equal to 70 volume % and less than or equal to 90 volume % of DMC and EMC in total. In the present specification, the volume ratio of a solvent of an electrolyte solution is measured with a GCMS (gas chromatograph mass spectrometer).

Examples of the first lithium salt include $LiPF_6$, $LiBF_4$, $Li[N(FSO_2)_2]$, $Li[N(CF_3SO_2)_2]$, $Li[B(C_2O_4)_2]$ (commonly referred to as "LiBOB"), $LiPO_2F_2$, and the like. The first lithium salt may be used alone, or two or more types thereof may be used in combination. In the first electrolyte solution, the first lithium salt may have a concentration of about 0.5 to 2.0 mol/l, for example.

<<(C) Initial Charging>>

The manufacturing method in the present embodiment includes (C) charging electrode group 10 impregnated with the first electrolyte solution to a voltage of 4.3 V or more.

By charging electrode group 10 to a voltage of 4.3 V or more, BP in the first electrolyte solution is oxidatively decomposed at positive electrode 11. Thereby, an oxide coating film is formed at positive electrode 11. The oxide coating film suppresses oxidative decomposition of DME. Further, when the first solvent includes EC, EC is reductively decomposed at negative electrode 12. Thereby, a good SEI is formed at negative electrode 12. This SEI suppresses co-intercalation of DME.

For the charging, a common charging/discharging device can be used. Electrode group 10 is connected to the charging/discharging device via the external terminal. The voltage of electrode group 10 is measured and monitored by the charging/discharging device. As long as electrode group 10 is charged to a voltage of 4.3 V or more, an upper limit voltage for the charging should not be limited in particular. However, when the voltage becomes too high, there may occur such an inconvenience that the positive electrode active material is damaged, or a large amount of gas is generated by oxidative decomposition of the first solvent. The upper limit voltage for the initial charging may be 5.0 V, 4.8 V, 4.6 V, or 4.4 V, for example. After electrode group 10 is charged to 4.3 V or more, electrode group 10 may be discharged to a voltage of less than 4.3 V.

The initial charging is preferably performed at a moderately low current rate. When the current rate is too high, the oxide coating film may become uneven. On the other hand, when the current rate is too low, it takes a long time for treatment. The current rate may be, for example, more than or equal to 0.1 C and less than or equal to 1.0 C, or more than or equal to 0.2 C and less than or equal to 0.9 C, or more than or equal to 0.3 C and less than or equal to 0.8 C, where "C" is a unit representing the magnitude of the current rate. A current rate of "1 C" represents a current rate at which an SOC (state of charge) reaches 100% from 0% by charging for one hour.

<<(D) Degassing>>

The manufacturing method in the present embodiment preferably includes (D) degassing from electrode group 10 after the charging.

In (C) initial charging, gas is generated within electrode group 10 by decomposition of BP and the solvent. The gas may become air bubbles and remain in electrode group 10. When air bubbles remain, an electrode reaction becomes uneven, and thus there is a possibility that cycle durability may be reduced. It is conceivable that air bubbles are easily removed from electrode group 10 by alternately repeating pressure reduction and pressure increase within case 20, for example.

The first electrolyte solution may be drained from case 20 before (E) impregnation with the second electrolyte solution. The composition of the first electrolyte solution changes by (C) initial charging. At least BP and EC are consumed. By replacing the first electrolyte solution with the fresh second electrolyte solution, improvement in cycle durability is expected, for example.

The first electrolyte solution is drained through the solution pouring hole, or a gap between main body 21 and lid 22. The first electrolyte solution with which electrode group 10 has been impregnated does not have to be entirely drained. It is sufficient as long as the first electrolyte solution that flows out when case 20 is inclined is removed, for example. Of course, if possible, the first electrolyte solution with which electrode group 10 has been impregnated may also be drained.

<<(E) Impregnation with Second Electrolyte Solution>>

The manufacturing method in the present embodiment includes (E) manufacturing battery 100 by impregnating electrode group 10 with the second electrolyte solution after the charging.

Electrode group 10 can be impregnated with the second electrolyte solution in the same manner as (B) impregnation with the first electrolyte solution described above. After electrode group 10 is impregnated with the second electrolyte solution, case 20 is sealed. For example, case 20 is sealed by bonding main body 21 and lid 22 and closing the solution pouring hole with the plug. Thereby, battery 100 is completed. That is, the non-aqueous electrolyte secondary battery is manufactured.

(Second Electrolyte Solution)

The second electrolyte solution includes a second solvent and a second lithium salt. The second solvent includes DME. DME promotes dissociation of the second lithium salt. DME has a low viscosity and also has a low melting point. Therefore, since the second solvent includes DME, improvement in low-temperature property is expected. In the present embodiment, oxidative decomposition of DME is suppressed, because the oxide coating film derived from BP is formed at the positive electrode before electrode group 10 is impregnated with the second electrolyte solution.

The second solvent preferably includes more than or equal to 10 volume % and less than or equal to 40 volume % of DME. Since the second solvent includes more than or equal to 10 volume % of DME, improvement in low-temperature properties is expected. The second solvent may include less than or equal to 40 volume % of DME. The second solvent more preferably includes more than or equal to 20 volume % and less than or equal to 40 volume % of DME, and further preferably includes more than or equal to 30 volume % and less than or equal to 40 volume % of DME. The rest of the second solvent other than DME can include a high-permittivity solvent, a low-viscosity solvent, and the like, for example.

Examples of the high-permittivity solvent include EC, propylene carbonate (PC), butylene carbonate (BC), γ-butyrolactone (GBL), and the like. Examples of the low-viscosity solvent include DMC, EMC, diethyl carbonate (DEC), methyl formate (MF), methyl acetate (MA), methyl propionate (MP), tetrahydrofuran (THF), 1,3-dioxolane, and the like. Each of the high-permittivity solvent and the low-viscosity solvent may be used alone, or two or more types thereof may be used in combination.

Preferably, the second solvent further includes more than or equal to 10 volume % and less than or equal to 30 volume % of EC, and more than or equal to 10 volume % and less than or equal to 30 volume % of EMC. Thereby, improvement in low-temperature properties and improvement in cycle durability are expected.

Preferably, the second solvent further includes more than or equal to 10 volume % and less than or equal to 30 volume % of DMC, in addition to DME, EC, and EMC. DMC preferably has a volume ratio less than that of the sum of DME and EMC. Thereby, improvement in cycle durability is expected. When DMC has a volume ratio more than or equal to that of the sum of DME and EMC, there is a possibility that resistance at an extremely low temperature may increase, because DMC has a melting point higher than those of DME and EMC.

More preferably, the second solvent includes DME, EC, EMC, and DMC in the following volume ratio. In this volume ratio, balance between low-temperature properties and cycle durability is extremely good.

[EC:DMC:EMC:DME=3:4-x:3:x (where $1 \leq x \leq 4$)]

As the second lithium salt, the lithium salt exemplified as the first lithium salt described above can be used. The second lithium salt may be the same as or different from the first lithium salt described above. In the second electrolyte solution, the second lithium salt may have a concentration of about 0.5 to 2.0 mol/l, for example. The concentration of the second lithium salt in the second electrolyte solution may be the same as or different from the concentration of the first lithium salt in the first electrolyte solution.

As long as the second electrolyte solution includes the second solvent and the second lithium salt, the second electrolyte solution may further include another component. For example, the second electrolyte solution may include BP. Examples of the other component include cyclohexylbenzene (CHB), ethylene sulfite (ES), propane sultone (PS), and the like. The second electrolyte solution may include 1 to 5 mass % of the other component, for example.

<<(F) Initial Cycle>>

The manufacturing method in the present embodiment may further include (F) charging/discharging battery 100. This initial cycle (initial charging/discharging) is also referred to as conditioning.

Conditions for the initial cycle should not be limited in particular. By the initial cycle, for example, stabilization of the SEI and the like are expected. The initial cycle can typically be performed in a temperature environment at 10 to 30° C. The current rate in the initial cycle may be set to about 0.5 to 2 C, for example. The initial cycle may be charging/discharging performed once, or charging/discharging repeated about 2 to 10 times.

The initial cycle may be full-range charging/discharging (SOC=0 to 100%), or partial charging/discharging, for example Partial charging/discharging means to perform charging/discharging such that the SOC is in the range of 30 to 70%, for example. The initial cycle may be started from discharging, or started from charging. When electrode group 10 is not discharged after (C) initial charging, the initial cycle is desirably started from discharging.

<<(G) Aging>>

The manufacturing method in the present embodiment may further include (G) aging battery 100. The aging is performed, for example, by leaving battery 100 adjusted to a predetermined SOC in a predetermined temperature environment for a predetermined period. By the aging, for example, improvement in cycle durability and the like is expected.

The SOC during the aging may be about 20 to 80% (typically, 40 to 60%), for example. The temperature environment during the aging may be about 30 to 70° C. (typically, 40 to 60° C.), for example. The leaving period may be about 1 to 240 hours (typically, 24 to 72 hours), for example. It is also conceivable that, depending on the amount of voltage drop by the aging, a fine short circuit may be detected.

<<Applications and the Like of Non-Aqueous Electrolyte Secondary Battery>>

As described above, the non-aqueous electrolyte secondary battery manufactured by the manufacturing method in the present embodiment includes DME as a solvent of an electrolyte solution. DME has a high donor number. DME has a low viscosity and also has a low melting point. Therefore, the non-aqueous electrolyte secondary battery is expected to be excellent in low-temperature properties. Further, the non-aqueous electrolyte secondary battery includes the oxide coating film derived from BP. Accordingly, oxidative decomposition of DMF is expected to be suppressed. Therefore, the non-aqueous electrolyte secondary battery is also expected to be excellent in cycle durability.

Since oxidative decomposition of DME is suppressed, the non-aqueous electrolyte secondary battery can be manufactured to have a high operating voltage. The operating voltage of a battery is determined by the combination of a positive electrode active material and a negative electrode active material. From the viewpoint of energy density, the non-aqueous electrolyte secondary battery is preferably manufactured to have an average operating voltage in the range of 3.0 to 4.5 V. The non-aqueous electrolyte secondary battery is more preferably manufactured to have an average operating voltage in the range of 3.5 to 4.5 V. The average operating voltage is calculated by dividing the amount of power (unit: Wh) obtained during discharging from an SOC of 100% to an SOC of 0% at a current rate of 1 C, by a discharge capacity (unit: Ah).

The non-aqueous electrolyte secondary battery having such properties is considered to be particularly suitable as a power supply for a hybrid vehicle (HV), a plug-in hybrid vehicle (PHV), an electric vehicle (EV), and the like, for example. However, the application of the non-aqueous electrolyte secondary battery manufactured by the manufacturing method in the present embodiment should not be limited to such a vehicle-mounted application. The non-aqueous electrolyte secondary battery manufactured by the manufacturing method in the present embodiment is applicable to any application.

EXAMPLES

Examples will be described below. However, the following examples are not intended to limit the scope of the claims.

Manufacturing of Non-Aqueous Electrolyte Secondary Battery

Example 1

(A) Construction of Electrode Group

As a positive electrode active material, $LiNi_{1/3}Co_{1/3}Mn_{1/3}O_2$ was prepared. The positive electrode active material, acetylene black, PVdF, and NMP were mixed in a predetermined proportion to prepare a positive electrode composite material paste. The positive electrode composite material paste was coated on a surface of an Al foil and dried to form a positive electrode composite material layer. Thereby, a positive electrode was manufactured. The positive electrode was rolled and cut. Thereby, positive electrode 11, which was a strip-like sheet, was prepared.

As a negative electrode active material, composite particles were prepared. The composite particles each included spheroidized natural graphite and amorphous carbon. The amorphous carbon covered the surface of the spheroidized natural graphite. The composite particles, CMC. SBR, and water were mixed in a predetermined proportion to prepare a negative electrode composite material paste. The negative electrode composite material paste was coated on a surface of a Cu foil and dried to form a negative electrode composite material layer. Thereby, a negative electrode was manufactured. The negative electrode was rolled and cut. Thereby, negative electrode 12, which was a strip-like sheet, was prepared.

Strip-like separator 13 was prepared. Separator 13 had a three-layer structure. Separator 13 was constructed by stacking a PP porous film, a PE porous film, and a PP porous film in this order Positive electrode 11 and negative electrode 12 were stacked to face each other, with separator 13 interposed therebetween, and then were wound. Thereby, wound-type electrode group 10 was constructed.

(B) Impregnation with First Electrolyte Solution

Cylindrical case 20 having 18650 size (diameter: 18 mm, height: 65 mm) was prepared. Electrode group 10 was housed in case 20.

A first electrolyte solution including a first solvent, a first lithium salt, and BP described below was prepared. The first electrolyte solution was poured into case 20. That is, electrode group 10 was impregnated with the first electrolyte solution.

First solvent: [EC:DMC:EMC=3:4:3 (volume ratio)]
First lithium salt: 1 mol/l of $LiPF_6$
BP: 2 mass %

(C) Initial Charging

Electrode group 10 was connected to a charging/discharging device via a terminal portion of case 20. Electrode group 10 was charged to 4.5 V at a current rate of ⅓ C.

(D) Degassing

The first electrolyte solution was drained from case 20. Gas generated by the initial charging was exhausted from case 20 and electrode group 10.

(E) Impregnation with Second Electrolyte Solution

A second electrolyte solution including a second solvent and a second lithium salt described below was prepared. The second electrolyte solution was poured into case 20. That is, electrode group 10 was impregnated with the second electrolyte solution. Further, case 20 was sealed. Thereby, battery 100 was manufactured. Battery 100 was configured to operate in the range of 3.0 to 4.1 V.

Second solvent: [EC:DMC:EMC:DME=3:1:3:3 (volume ratio)]
Second lithium salt: 1 mol/l of $LiPF_6$ (F) Initial Cycle Battery 100 was discharged to 3.0 V at a current rate of ⅓ C in an environment at 25° C. Then, a charging/discharging cycle including a series of constant current charging and constant current discharging described below was repeated three times.

Constant current charging: current rate=⅓ C, final voltage=4.1 V
Constant current discharging: current rate=⅓ C, final voltage=3.0 V (G) Aging The SOC of battery 100 was adjusted to 50%. Battery 100 was left within a thermostatic chamber set at 50° C. for 24 hours. Thus, battery 100 in accordance with Example 1 was manufactured.

Examples 2 to 5

Each battery 100 was manufactured by the same manufacturing method as that in Example 1, except that the volume ratio among the components of the second solvent was changed as shown in Table 1 below.

Examples 6 and 7

Each battery 100 was manufactured by the same manufacturing method as that in Example 1, except that the amount of BP in the first electrolyte solution was changed as shown in Table 1 below.

Comparative Example 1

Electrode group 10 was constructed by the same manufacturing method as that in Example 1. Electrode group 10 was housed in case 20. Electrode group 10 was impregnated with the first electrolyte solution shown in Table 1 below. Case 20 was sealed. A charging/discharging cycle including a series of constant current charging and constant current discharging described below was repeated three times.

Constant current charging: current rate=⅓ C, final voltage=4.1 V

Constant current discharging: current rate=⅓ C, final voltage=3.0 V

Then, battery 100 was subjected to aging under the same conditions as those in Example 1. Thus, battery 100 in accordance with Comparative Example 1 was manufactured.

Comparative Examples 2 and 3

Each battery 100 was manufactured by the same manufacturing method as that in Comparative Example 1, except that the first electrolyte solution shown in Table 1 below was used.

<Evaluation>

<<Measurement of Initial Resistance at 0° C.>>

The SOC of each battery was adjusted to 60% in an environment at 25° C. The battery was placed within a thermostatic chamber set at 0° C. The battery was discharged at a current rate of 3 C for 10 seconds. The amount of voltage drop after the 10-second discharging was measured. An initial resistance was calculated by dividing the amount of voltage drop by a discharge current. The result is shown in the column "0° C." in Table 1 below. Each value is a relative value obtained when the initial resistance in Comparative Example 1 is set to 100. It is indicated that, as the value is lower, the battery is more excellent in low-temperature properties.

<<Measurement of Initial Resistance at −40° C.>>

The amount of voltage drop was measured and the initial resistance was calculated by the same procedure as that in the "Measurement of Initial resistance at 0° C.", except that each battery was placed within a thermostatic chamber set at −40° C. The result is shown in the column "−40° C." in Table 1 below. Each value is a relative value obtained when the initial resistance in Comparative Example 1 is set to 100. It is indicated that, as the value is lower, the battery is more excellent in low-temperature properties.

<<Evaluation of Cycle Durability>>

Each battery was placed within a thermostatic chamber set at 60° C. Charging/discharging was repeated 500 times in the range of 3.0 to 4.1 V at a current rate of 2 C. A capacity maintenance ratio was calculated by dividing the 500th discharge capacity by the first discharge capacity. The result is shown in the column "Capacity Maintenance Ratio" in Table 1 below. Each value is a relative value obtained when the capacity maintenance ratio in Comparative Example 1 is set to 100. It is indicated that, as the value is higher, oxidative decomposition of DME is suppressed more.

TABLE 1

List of Examples and Comparative Examples

| | First Electrolyte Solution | | | Second Electrolyte Solution | | | | Cycle Durability |
|---|---|---|---|---|---|---|---|---|
| | First Solvent [volume ratio] | $LiPF_6$ [mol/l] | BP [mass %] | Second Solvent [volume ratio] | Second Lithium Salt $LiFF_6$ [mol/l] | Initial Resistance 0° C. [-]* | Initial Resistance −40° C. [-]* | Capacity Maintenance Ratio [-]* |
| Comparative Example 1 | EC:DMC:EMC:DME = 3:4:3:0 | 1 | 0 | — | — | 100 | 100 | 100 |
| Comparative Example 2 | EC:DMC:EMC:DME = 3:1:3:3 | 1 | 0 | — | — | 90.0 | 86.6 | 85.0 |
| Comparative Example 3 | EC:DMC:EMC:DME = 3:1:3:3 | 1 | 2 | — | — | 93.0 | 88.6 | 86.3 |
| Example 1 | EC:DMC:EMC = 3:4:3 | 1 | 2 | EC:DMC:EMC:DME = 3:1:3:3 | 1 | 83.0 | 79.0 | 103.8 |
| Example 2 | EC:DMC:EMC = 3:4:3 | 1 | 2 | EC:DMC:EMC:DME = 3:3:3:1 | 1 | 88.7 | 86.0 | 105.4 |
| Example 3 | EC:DMC:EMC = 3:4:3 | 1 | 2 | EC:DMC:EMC:DME = 3:0:3:4 | 1 | 77.3 | 73.0 | 102.5 |
| Example 4 | EC:DMC:EMC = 3:4:3 | 1 | 2 | EC:DMC:EMC:DME = 1:4:3:2 | 1 | 87.1 | 82.8 | 97.4 |
| Example 5 | EC:DMC:EMC = 3:4:3 | 1 | 2 | EC:DMC:EMC:DME = 3:4:1:2 | 1 | 86.6 | 106.0 | 104.0 |
| Example 6 | EC:DMC:EMC = 3:4:3 | 1 | 1 | EC:DMC:EMC:DME = 3:1:3:3 | 1 | 85.4 | 81.3 | 96.5 |
| Example 7 | EC:DMC:EMC = 3:4:3 | 1 | 4 | EC:DMC:EMC:DME = 3:1:3:3 | 1 | 94.6 | 91.7 | 98.8 |

*Each value is a relative value obtained when the value in Comparative Example 1 is set to 100.

<Results>

The battery in Comparative Example 1 is inferior in low-temperature properties. This seems to be because the electrolyte solution does not include DME. In Comparative Example 2, low-temperature properties are improved when compared with Comparative Example 1, because the electrolyte solution includes DME. However, the capacity maintenance ratio is reduced when compared with Comparative Example 1, because DME is oxidatively decomposed.

In Comparative Example 3, the electrolyte solution includes both DME and BP. However, in Comparative Example 3, the capacity maintenance ratio is reduced when compared with Comparative Example 1, as in Comparative Example 2. It seems that DME is oxidatively decomposed before BP forms an oxide coating film.

In each of Examples 1 to 7, the capacity maintenance ratio is higher than those in Comparative Examples 2 and 3. Therefore, oxidative decomposition of DME seems to be suppressed in Examples 1 to 7. This seems to be because an oxide coating film of BP is formed from the first electrolyte solution including BP, and then the electrode group is impregnated with the second electrolyte solution including DME. In each of Examples 1 to 7, the second solvent includes more than or equal to 10 volume % and less than or equal to 40 volume % of DME.

In Example 4, the capacity maintenance ratio is slightly lower than those in other examples. There is a possibility that co-intercalation of DME may occur at the negative electrode due to a small amount of EC in the second solvent. Therefore, from the viewpoint of cycle durability, it is considered preferable that the second solvent includes more than or equal to 10 volume % of EC.

In Example 5, the resistance at an extremely low temperature (−40° C.) increases. This seems to be because DMC has a volume ratio more than that of the sum of DME and EMC.

In Example 6, the capacity maintenance ratio is lower than those in other examples. This seems to be due to a small amount of BP. Therefore, from the viewpoint of further increasing the effect of suppressing oxidative decomposition of DME, it is considered preferable that the first electrolyte solution includes more than or equal to 1 mass % of BP.

The battery in Example 7 is slightly inferior in low-temperature properties, when compared with other examples. This seems to be due to a large amount of BP. Therefore, from the viewpoint of further increasing the effect of improving low-temperature properties, it is considered preferable that the first electrolyte solution includes less than or equal to 4 mass % of BP.

It should be understood that the embodiment disclosed herein is illustrative and non-restrictive in every respect. The technical scope defined by the scope of the claims is intended to include any modifications within the scope and meaning equivalent to the scope of the claims.

What is claimed is:

1. A method of manufacturing a non-aqueous electrolyte secondary battery, the method comprising:
   constructing an electrode group including a positive electrode and a negative electrode;
   impregnating the electrode group with a first electrolyte solution;
   charging the electrode group impregnated with the first electrolyte solution to a voltage of 4.3 V or more; and
   manufacturing the non-aqueous electrolyte secondary battery by impregnating the electrode group with a second electrolyte solution after the charging,
   the first electrolyte solution including a first solvent, a first lithium salt, and biphenyl,
   the first solvent not including 1,2-dimethoxyethane,
   the second electrolyte solution including a second solvent and a second lithium salt,
   the second solvent including 1,2-dimethoxyethane.

2. The method of manufacturing the non-aqueous electrolyte secondary battery according to claim 1, wherein
   the negative electrode includes composite particles,
   the composite particles each include graphite and amorphous carbon,
   the amorphous carbon covers a surface of the graphite, and
   the first solvent includes ethylene carbonate.

3. The method of manufacturing the non-aqueous electrolyte secondary battery according to claim 1, wherein the second solvent includes more than or equal to 10 volume % and less than or equal to 40 volume % of 1,2-dimethoxyethane.

4. The method of manufacturing the non-aqueous electrolyte secondary battery according to claim 1, wherein the second solvent further includes more than or equal to 10 volume % and less than or equal to 30 volume % of ethylene carbonate, and more than or equal to 10 volume % and less than or equal to 30 volume % of ethyl methyl carbonate.

5. The method of manufacturing the non-aqueous electrolyte secondary battery according to claim 4, wherein
   the second solvent further includes more than or equal to 10 volume % and less than or equal to 30 volume % of dimethyl carbonate, and
   in the second solvent, dimethyl carbonate has a volume ratio less than that of a sum of 1,2-dimethoxyethane and ethyl methyl carbonate.

6. The method of manufacturing the non-aqueous electrolyte secondary battery according to claim 1, wherein the first electrolyte solution includes more than or equal to 1 mass % and less than or equal to 4 mass % of biphenyl.

7. The method of manufacturing the non-aqueous electrolyte secondary battery according to claim 1, wherein the positive electrode includes a compound expressed by a formula (I):

$$LiNi_aCo_bMn_cO_2 \qquad (I)$$

where $0<a<1$, $0<b<1$, $0<c<1$, and $a+b+c=1$.

8. The method of manufacturing the non-aqueous electrolyte secondary battery according to claim 1, wherein the second solvent includes more than or equal to 20 volume % and less than or equal to 40 volume % of 1,2-dimethoxyethane.

9. The method of manufacturing the non-aqueous electrolyte secondary battery according to claim 1, wherein the second solvent includes more than or equal to 30 volume % and less than or equal to 40 volume % of 1,2-dimethoxyethane.

10. The method of manufacturing the non-aqueous electrolyte secondary battery according to claim 1, wherein the first electrolyte solution includes more than or equal to 2 mass % and less than or equal to 4 mass % of biphenyl.

\* \* \* \* \*